(12) United States Patent
Westelynck

(10) Patent No.: US 9,404,057 B2
(45) Date of Patent: *Aug. 2, 2016

(54) HYDROCARBON DILUENT WITH A LOW VOC LEVEL FOR CONSTRUCTION MATERIALS

(75) Inventor: Antoine Westelynck, Brueil en Vexin (FR)

(73) Assignee: TOTAL MARKETING SERVICES, Puteaux (FR)

( * ) Notice: Subject to any disclaimer, the term of this patent is extended or adjusted under 35 U.S.C. 154(b) by 391 days.

This patent is subject to a terminal disclaimer.

(21) Appl. No.: 13/255,273

(22) PCT Filed: Mar. 11, 2010

(86) PCT No.: PCT/FR2010/050425
§ 371 (c)(1),
(2), (4) Date: Sep. 8, 2011

(87) PCT Pub. No.: WO2010/103244
PCT Pub. Date: Sep. 16, 2010

(65) Prior Publication Data
US 2011/0319539 A1  Dec. 29, 2011

(30) Foreign Application Priority Data
Mar. 12, 2009 (FR) .................... 09 01157

(51) Int. Cl.
*C08K 5/01* (2006.01)
*C10G 25/00* (2006.01)
*C10G 29/20* (2006.01)
(Continued)

(52) U.S. Cl.
CPC ............... *C10M 101/02* (2013.01); *C08K 5/01* (2013.01); *C08L 27/06* (2013.01); *C08L 83/00* (2013.01); *C09D 7/001* (2013.01); *C10G 45/58* (2013.01); *C10M 107/02* (2013.01); *C08L 2205/02* (2013.01); *C10G 2300/1011* (2013.01); *C10G 2300/1055* (2013.01); *C10G 2300/1074* (2013.01); *C10G 2300/202* (2013.01); *C10G 2300/301* (2013.01); *C10G 2300/302* (2013.01); *C10G 2300/304* (2013.01); *C10G 2300/802* (2013.01); *C10M 2203/1025* (2013.01);
(Continued)

(58) Field of Classification Search
CPC ...... C10M 101/02; C08L 83/00; C08L 27/06; C08K 5/01
USPC ........ 106/502; 524/318, 474, 322; 208/27, 28
See application file for complete search history.

(56) References Cited

U.S. PATENT DOCUMENTS 2,346,970 A    4/1944  Jones
5,096,883 A *  3/1992  Mercer et al. ................. 507/103
(Continued)

FOREIGN PATENT DOCUMENTS

DE        258 495         7/1988
WO    WO 02/086007       10/2002
(Continued)

Primary Examiner — Jane L Stanley
(74) Attorney, Agent, or Firm — Harness, Dickey & Pierce, P.L.C.

(57) ABSTRACT

A hydrocarbon diluent for the dilution of polymer with a pour point below −15° C. according to ASTM standard D97, with a boiling point comprised between 280 and 450° C., including more than 50% by weight of isoparaffins, and naphthenes up to at most 40% by weight, and constituted by a mixture of hydrocarbons with a boiling point above 200° C., obtained by distillation of hydrodewaxed gas-oil cuts.

22 Claims, 2 Drawing Sheets

(51) Int. Cl.
  *C10G 73/02*   (2006.01)
  *C10M 101/02*  (2006.01)
  *C08L 83/00*   (2006.01)
  *C08L 27/06*   (2006.01)
  *C09D 7/00*    (2006.01)
  *C10G 45/58*   (2006.01)
  *C10M 107/02*  (2006.01)

(52) U.S. Cl.
  CPC ...... *C10M2205/173* (2013.01); *C10N 2230/74* (2013.01); *Y02P 30/20* (2015.11)

(56) References Cited

U.S. PATENT DOCUMENTS

| | | | |
|---|---|---|---|
| 5,167,847 A * | 12/1992 | Olavesen et al. | 508/110 |
| 5,374,495 A | 12/1994 | Ata et al. | |
| 5,632,884 A | 5/1997 | Jamois et al. | |
| 5,833,839 A | 11/1998 | Wittenbrink et al. | |
| 5,906,727 A | 5/1999 | Wittenbrink et al. | |
| 6,416,657 B1 | 7/2002 | Fersing et al. | |
| 7,326,817 B2 | 2/2008 | Dunlop et al. | |
| 7,442,739 B1 | 10/2008 | Hatfield | |
| 7,528,197 B2 | 5/2009 | Masubuchi et al. | |
| 2001/0021747 A1 | 9/2001 | Masubuchi et al. | |
| 2002/0139962 A1* | 10/2002 | Fefer et al. | 252/570 |
| 2005/0197256 A1* | 9/2005 | Dunlop et al. | 507/103 |
| 2009/0014354 A1 | 1/2009 | Knuuttila et al. | |
| 2009/0111723 A1 | 4/2009 | Shibata et al. | |
| 2009/0270294 A1 | 10/2009 | Souchez et al. | |
| 2010/0137176 A1 | 6/2010 | Aoki et al. | |
| 2010/0154674 A1 | 6/2010 | Chaverot et al. | |
| 2010/0307428 A1 | 12/2010 | Behrendt et al. | |

FOREIGN PATENT DOCUMENTS

| | | |
|---|---|---|
| WO | WO 03/074634 | 9/2003 |
| WO | WO 03/074635 | 9/2003 |
| WO | WO 2004/009738 | 1/2004 |
| WO | WO 2008/033899 | 3/2008 |
| WO | WO 2008/138861 | 11/2008 |

* cited by examiner

HYDROCARBON DILUENT WITH A LOW VOC LEVEL FOR CONSTRUCTION MATERIALS

CROSS-REFERENCE TO RELATED APPLICATIONS

This application is a National Phase Entry of International Application No. PCT/FR2010/050425, filed on Mar. 11, 2010, which claims priority to French Patent Application Serial No. 09/01157, filed on Mar. 12, 2009, both of which are incorporated by reference herein.

BACKGROUND AND SUMMARY

The present invention relates to a hydrocarbon diluent with a low VOC level for use in construction materials, in particular in compositions and materials based on resins and mastics. It also relates to compositions and construction materials containing this diluent.

Numerous products are used in construction materials, for example for floor coverings, paints, wallpapers and mastics for windows or seals of sanitary fittings. They are generally constituted by one or two active components, the viscosity of which is adjusted for the intended application by adding a diluent. These diluents are mixed with at least one resin, a polymer and/or any other paste of high viscosity and have a tendency either immediately, or over time to evaporate and/or degrade, becoming a source of emissions that are often toxic to the environment and more particularly to human and animal health. These emissions are called VOC emissions (VOC: volatile organic compounds). These emissions affect everyday life and constitute an important source of interior pollution of homes, offices and government buildings and of any enclosed space where ventilation is limited and in any case is not directly open to air circulation. These emissions can be considerable at the time of installation but there can also be a longer-term effect from residual volatility that is a function of time or is even connected with progressive degradation of the covering or adhesive composition or mastic. The disadvantage of these materials depends on the amount of materials used, the ventilation of the premises where they are used and the working environment at the time of installation.

The emissions resulting from construction materials are in particular connected with the nature and the emission properties of the diluents used in these materials. These diluents, the purpose of which is to lower the viscosity of the materials temporarily, are classified into at least three types of compounds on the basis of various national or international schemes leading to the attribution of a label or defining the acceptable emission limits for these products: for example AgBB and Blauer Engel in Germany, M1 in Finland, the label "Danish Indoor Climate label" or DICL in Denmark, Emicode, Oeko-Tex, Greenguard or also the protocol of the AFS-SET (Agence Française de Sécurité Sanitaire de l'Environnement et du Travail French Agency For Sanitary Safety of Environment and Labour) in France. The classification of the characteristics of these VOC products as defined by the World Health Organization and reflected in standard ISO 16000-6 was used as the basis for the classification presented in Table 1 below:

TABLE 1

| | Boiling point (° C.) ISO 16000-6 | Pressure (kPa) ISO 16000-6 | length of the hydrocarbon chains |
|---|---|---|---|
| Very VOC or VVOC | <0° C. to 50-100° C. | >15 kPa | <C6 |
| VOC | 50/100° C. to 240/260° C. | >100 kPa | C6 to C16 |
| Semi VOC | 240/260° C. to 380/400° C. | 0.02 to 10-8 kPa | C16 to C22 |

Within the scope of the present invention, hydrocarbon diluents were sought that have low emission properties, of the low VOC type, capable of preserving the fundamental properties of construction materials, such as floor coverings, adhesive or mastics, i.e. the stability of the material before and after its installation, its ageing, its mechanical properties, its initial appearance, etc. For the PVC pastes used in floor coverings, the use of various types of hydrocarbon solvents is known, such as white spirit, kerosene, isoparaffins or gas-oil: these compounds make it possible to obtain specific rheological properties required for application of the product and a decrease in viscosity of the PVC paste. However, none of these products has characteristics that satisfy the necessary requirements for limiting the level of emission of VOC, semi VOC or very VOC volatile matter.

For simultaneously satisfying the reductions in viscosity and maintaining the properties necessary for the application of these PVC pastes or these mastics, patents WO02/086007 and WO2008/033899 propose the use of esters of fatty acids derived from vegetable oils or these oils themselves mixed with wetting compounds and dispersants whose emissions are zero and which maintain certain expected properties of the final material. Patent WO2004/009738 proposes the use of cuts resulting from the conversion of gas by the Fisher-Tropsch process by hydrocracking/hydro-isomerization of the latter as diluent for silicone-based rubbers.

The present invention has the purpose of using, in construction materials and in particular PVCs used in floor coverings and mastics, diluents that are not of renewable origin, but of fossil origin which make it possible to lower the viscosity of the materials in order to facilitate their handling and their installation but which at the same time can maintain the physical properties required for these materials and their long-term use. Finally, the finished products using these diluents according to the invention must meet the non-VOC requirements of the protocols such as Afsset, AgBB, Blauer Engel, Emicode, Oeko-Tex or Greenguard.

The present invention therefore relates to a hydrocarbon diluent with a low VOC emission for dilution of polymer in construction materials. It is obtained from a mixture of hydrocarbons with a boiling point above 200° C. obtained from the distillation of hydrodewaxed gas-oil cuts. It has a pour point below −15° C. This diluent is a cut with boiling points comprised between 280° C. and 450° C., the sulphur content of which is less than 10 ppm. It contains more than 50% by weight of isoparaffins, and naphthenes up to at most 40% by weight.

By "with low emission of VOC" is meant diluents which, when mixed in construction materials, for example coatings or mastics, meet the requirements of the assessment schemes such as AgBB, Blauer Engel, Emicode, Oeko-Tex, Greenguard or AFSSET. Said diluents combine the advantages of attaining characteristics of the final products identical to those originally manufactured with semi VOC, VOC or very VOC diluents, with the advantages of having a very low volatility, lower than that of the products of the prior art. Preferably, the diluents according to the invention are selected from hydrodewaxed hydrocarbon cuts the viscosity of which at 40° C. according to ASTM standard D445 is greater than 5 mm$^2$/s, more particularly the cuts with a viscosity greater than 7 mm$^2$/s at 40° C.

The hydrodewaxed hydrocarbon cuts selected originate from the hydrodewaxing of various gas-oil cuts obtained by atmospheric distillation, vacuum distillation, hydrotreating, hydrocracking, catalytic cracking and/or visbreaking, or alternatively products originating from the conversion of biomass, optionally after an additional treatment of desulphurization and/or removal of aromatics. The term hydrodewaxed diluent will be used hereinafter in the present description to denote this hydrocarbon diluent. For certain of the applications of the invention, these cuts can have wide distillation ranges of more than 50° C. in the range 280° C.-450° C., or narrower cuts.

Thus, in a preferred embodiment of the invention, the diluent originates from a distillation cut of hydrodewaxed hydrocarbons with a pour point according to ASTM standard D97 below −30° C. In parallel, the flash point of these compounds according to the invention is very high, greater than 140° C. Obtaining a very low pour point favours maintaining the diluent in a mixture, for example with PVC resins or polymers for mastics, and limits or even prevents sweating thereof. Absence of sweating is particularly desirable at low temperature.

The diluents according to the invention are moreover constituted by a majority of isoparaffins and a minority of normal paraffins. The diluent will always comprise more than 10% by weight of naphthenes. Preferably, these diluents obtained from hydrocarbons have been highly hydrodewaxed and therefore contain more than 65% by weight of isoparaffins and less than 10% by weight of normal paraffins. The presence of naphthenes in their composition distinguishes them from other products constituted only by isoparaffins and paraffins that are used in the same applications. Preferably, these hydrodewaxed diluents will contain at least 20% by weight of naphthenes. Typically, within the scope of the present invention, diluents are preferred the naphthene content of which varies from 20 to 35% by weight of the diluent.

More generally, the diluents according to the invention are obtained from hydrocarbons with chain lengths predominantly greater than 16 carbon atoms. Thus, this diluent is composed of less than 65% by weight of hydrocarbons having a chain length comprised between 16 and 22 carbon atoms which are known to be semi-VOC hydrocarbons, and more than 30% by weight of hydrocarbons having a chain length greater than 22 carbon atoms that are non-VOC, as they are non-volatile or of low volatility. In a preferred embodiment, the diluent is composed of less than 50% by weight of hydrocarbons having a chain length comprised between 16 and 22 carbon atoms, and more than 40% by weight of hydrocarbons having a chain length greater than 22 carbon atoms. These hydrocarbons with chain lengths greater than C22 correspond to hydrocarbons containing chains from C23 to at most C30, in order to preserve compatibility with the polymers, which deteriorates as the molecular weight increases.

Moreover, these diluents according to the invention comprise less than 10 ppm of sulphur, preferably less than 2 ppm of sulphur. Their content of aromatics is less than 500 ppm.

As these diluents can be mixed with other compounds, the present invention also relates to a composition of diluents with a low VOC emission. This composition, the second subject of the invention, mainly comprises hydrodewaxed hydrocarbons as described above, but also hydrocarbons constituted by the conventional diluents such as acids and esters of fatty acids with carbon chains with more than 16 carbon atoms, hydrotreated and/or hydrocracked cuts of the gas-oil type with a boiling point comprised between 280 and 450° C. Of course, the cut range adopted for these conventional diluents will be adapted by a person skilled in the art to the main hydrodewaxed diluent with a low VOC. The mixtures thus prepared for obtaining diluent compositions with a low VOC will contain more than 50% by weight of isoparaffins and less than 20% by weight of normal paraffins. The level of naphthenes present will be comprised between 10 and 30% by weight.

The preferred diluent compositions will comprise more than 60% by weight of isoparaffins and less than 10% by weight of normal paraffins, the difference representing the naphthenes that are present. Within the scope of this embodiment of the present invention, the diluent composition will comprise more than 40% by weight of hydrodewaxed diluent, and preferably more than 60% by weight. As for the diluent according to the invention, alone, the composition will comprise less than 65% by weight of hydrocarbons having a chain length comprised between 16 and 22 carbon atoms, and more than 30% by weight of hydrocarbons having a chain length greater than 22 carbon atoms.

A third subject of the invention is the use of the hydrodewaxed diluent according to the invention alone or in combination with at least one conventional diluent for the dilution of resins used for the manufacture of construction materials. The diluents used alone or in combination with a conventional diluent do not alter any of the physical characteristics of the formulations of resins in which they are used, in particular the thermal stability, the optical and mechanical properties and the volatility at 70° C. of the finished product. Moreover, the VOC emissions from the finished products containing them meet the AgBB, Blau Engel, Emicode, Oeko-Tex, Greenguard or Afsset requirements.

The term "resins" as used here means PVC resins, which are added to PVC pastes (or Plastisols) used in the manufacture of floor coverings, coatings for threads or textiles, wallpapers, flexible films, tarpaulins, mastics, etc. These pastes are obtained by the homopolymerization of polyvinyl chloride or PVC, or polymerization of PVC with a comonomer, for example lactones or other olefins that can polymerize with vinyl chloride and form part of the composition of these resins. Moreover, the term "mastics" means compositions based on polymers or resins in combination with other compounds known by a person skilled in the art, such as plasticizers, fillers and diluents for adjusting the viscosity.

A fourth subject of the invention is the use of the hydrodewaxed diluent alone or in combination with a conventional diluent for the dilution of mastic or of silicone-based adhesives (for example silicone mastics RTV-1 (Room Temperature vulcanizable-1 component) or of modified silicone polymers (SMP: Silane Modified Polymers), for example of type ST-PE (Silane Terminated-PolyEther) or MS polymer (MS=modified silane) or ST-PU (Silane Terminated PolyUrethane). These polymers are mixed with any other compound known by a person skilled in the art, such as plasticizers, mineral fillers, additives, adhesion promoter, catalyst, etc.

The invention can therefore be defined by the following characteristics:

It relates to a hydrocarbon diluent for the dilution of polymer with a pour point below −15° C. according to ASTM standard D97, comprising more than 50% by weight of isoparaffins and naphthenes up to at most 40% by weight, and constituted by a mixture of hydrocarbons with a boiling point above 200° C., obtained by distillation of hydrodewaxed gas-oil cuts.

This diluent preferably has a boiling point comprised between 280 and 450° C.

This diluent preferably has a pour point below −30° C. according to ASTM standard D97.

This diluent preferably has a viscosity greater than 5 mm$^2$/s at 40° C., and in particular greater than 7 mm$^2$/s at 40° C., according to ASTM standard D445.

This diluent is preferably derived from hydrodewaxed hydrocarbons, in particular from the hydrodewaxing of various gas-oil cuts obtained by atmospheric distillation, vacuum distillation, hydrotreating, hydrocracking, catalytic cracking and/or visbreaking, or alternatively products derived from the conversion of biomass, optionally after an additional treatment of desulphurization and/or removal of aromatics.

The composition of this diluent comprises at least 10% by weight of naphthenes.

This diluent is preferably derived from a distillation cut of hydrodewaxed hydrocarbons with a pour point according to ASTM standard D97 below −30° C. and flash point above 140° C.

This diluent preferably comprises from 20 to 35% by weight of naphthenes and more than 60% by weight of isoparaffins.

This diluent preferably comprises more than 65% by weight of isoparaffins and less than 10% by weight of normal paraffins.

This diluent preferably comprises less than 65% by weight of hydrocarbons having a chain length comprised between 16 and 22 carbon atoms, and more than 30% by weight of hydrocarbons having a chain length greater than 22 carbon atoms, preferably from C23 to C30.

This diluent preferably comprises less than 50% by weight of hydrocarbons having a chain length comprised between 16 and 22 carbon atoms, and more than 40% by weight of hydrocarbons having a chain length greater than 22 carbon atoms, preferably from C23 to C30.

This diluent is preferably devoid of normal paraffins.

Its sulphur content is preferably less than 10 ppm, in particular less than 2 ppm.

It preferably contains less than 500 ppm of aromatics, measured by UV spectrometry.

The invention also relates to a composition of diluents comprising the diluents described above in combination with at least one so-called "conventional" diluent, for example belonging to the group comprising acids and esters of fatty acids with carbon chains with more than 16 carbon atoms, cuts of the hydrocracked and/or hydrotreated gas-oil type with a boiling point comprised between 200 and 450° C., in particular comprised between 280 and 450° C., or comprised between 200 and 300° C. This composition preferably comprises more than 50% by weight of isoparaffins and less than 20% by weight of normal paraffins, preferably more than 60% by weight of isoparaffins and less than 10% by weight of normal paraffins. This composition preferably comprises more than 40% by weight of hydrodewaxed diluent, preferably more than 60% by weight.

The invention also relates to a composition of polymer or resin diluted with a diluent as described previously, preferably for construction materials, in particular resins for construction materials, adhesives, floor coverings, wallpapers and mastics, in particular mastics or adhesives based on silicone or modified silicone polymers. The invention also relates to the use of the hydrodewaxed diluent as described previously, alone or in combination with at least one so-called "conventional" diluent, for example belonging to the group comprising acids and esters of fatty acids with carbon chains with more than 16 carbon atoms, hydrotreated and/or hydrocracked cuts of the gas-oil type with a boiling point comprised between 200 and 450° C., in particular comprised between 280 and 450° C., for the dilution of resins for construction materials, in adhesives, floor coverings, wallpapers and mastics, in particular mastics or adhesives based on silicone or modified silicone polymers. The advantages of the present invention are described in the examples given below, which illustrate but do not limit the invention.

DETAILED DESCRIPTION

Example 1

The present example describes the various diluents used comprising those of the prior art with reference Ti and those of the invention with reference Di and their comparative use in formulations of PVC paste. The diluents of the prior art are white spirit (T1), kerosene (T2), dodecylbenzene (T3) and finally a hydrocracked gas-oil cut (T4) of cut 300° C. and above. The diluents of the invention are two products derived from the distillation of a hydrodewaxed cut 280-450° C., D1 corresponding to a cut 290-380° C. and D2 to a cut distilling at above 340° C. A third diluent D3 corresponds to a mixture of 70% by weight of diluent D1 with 30% of T4.

Table 1 below presents the characteristics of all of the diluents tested.

TABLE 1

|  | Test method | Unit | T1 | T2 | T3 | T4 | D1 | D2 | D3 |
| --- | --- | --- | --- | --- | --- | --- | --- | --- | --- |
| Initial boiling point | ASTM D86 | ° C. | 182 | 233 | 280 | 305 | 289 | 334 | 295 |
| Final boiling point | ASTM D86 | ° C. | 216 | 264 | 310 | 347 | 373 | 378 | 380 |
| Distillation range |  | ° C. | 34 | 31 | 30 | 42 | 84 | 44 | 85 |

TABLE 1-continued

|  | Test method | Unit | T1 | T2 | T3 | T4 | D1 | D2 | D3 |
|---|---|---|---|---|---|---|---|---|---|
| Viscosity at 20° C. | ASTM D445 | mm$^2$/s | 1.7 | 3.3 |  | 11 | 17.7 | 21.4 | 13.0 |
| Viscosity at 40° C. | ASTM D445 | mm$^2$/s |  | 2.3 | 5.5 | 6.1 | 7.7 | 10.6 | 7.1 |
| Pour point | ASTM D97 | ° C. | <−30 | <−20 |  | −2 | −42 | −35 | −18 |
| Flash point | ASTM D93 | ° C. | 65 | 103 |  | 159 | 149 | 175 | 151 |
| Distribution of carbons | ASTM D2887 | wt. % |  |  |  |  |  |  |  |
| <C16 |  |  | 100 | 94 | 0 | 0 | 8.0 | 0.5 | 4.1 |
| C16-C22 |  |  | 0 | 6 | 100 | 90.1 | 48.8 | 20.7 | 62.8 |
| >C22 |  |  | 0 | 0 | 0 | 9.9 | 43.2 | 78.8 | 33.1 |
| Composition | GC MS | wt. % |  |  |  |  |  |  |  |
| isoalkanes |  |  | 24.9 | 30.5 | 0 | 59.0 | 73.1 | 65.7 | 69.5 |
| n alkanes |  |  | 21.3 | 24.0 | 0 | 8.3 | 0 | 0 | 5.5 |
| cycloalkanes |  |  | 53.8 | 45.5 | 0 | 32.7 | 26.9 | 34.3 | 25.0 |

These various diluents were tested in a simple formulation of compact PVC paste for use in floor coverings, to compare the usage levels of diluents D1 and D2 according to the invention with those of the prior art, T1, T2 and T3. The PVC resin used is LACOVYL PB1704 marketed by Arkema with a proportion of 100 parts in the presence of a plasticizer of the DINP (diisononylphthalate) type at a level of 40 phr (phr=per hundred parts of PVC resin) and samples are prepared containing 0, 2, 4 and 6 phr of diluent.

The change in the viscosity measured in poise according to standard EN3219 is measured as a function of the shear rate from 1 to 1000 s$^{-1}$ of the so-called "compact" formulas obtained after 2 hours and then 24 hours; the results are shown below in Table 2.

Figure 1:
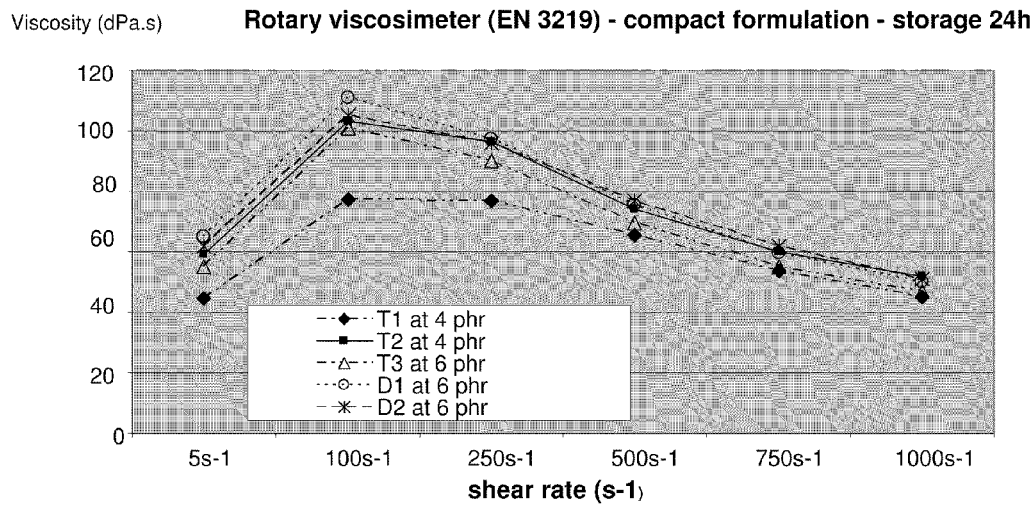
FIG. 1 is a graph showing rheological behavior obtained with various diluents.

Compared with the diluents of the prior art, the diluents of the invention make it possible to maintain the viscosity characteristics of the expected final products after adjustment of their usage level. In addition, FIG. 1 shows that for identical shear rates of the finished product after storage for 24 hours the products obtained with the diluents according to the invention D1 and D2 have rheological behaviour comparable to those obtained with diluents T1, T2 and T3 of the prior art.

Taking a second formulation of PVC paste in cellular form containing a PVC resin LACOVYL PB1156 marketed by Arkema but containing 50 phr of DINP, we investigated the rheological behaviour of various pastes prepared with the same diluents as in the preceding case with the same dilution

TABLE 2

| storage time | | 2 h | | | | | | 24 h | | | | |
|---|---|---|---|---|---|---|---|---|---|---|---|---|
| Level of diluent | 5 s$^{-1}$ | 100 s$^{-1}$ | 250 s$^{-1}$ | 500 s$^{-1}$ | 750 s$^{-1}$ | 1000 s$^{-1}$ | 5 s$^{-1}$ | 100 s$^{-1}$ | 250 s$^{-1}$ | 500 s$^{-1}$ | 750 s$^{-1}$ | 1000 s$^{-1}$ |
| T1 0 phr | 126 | 202 | 188 | 140 | 107 | 89.3 | 118 | 235 | 205 | 154 | 122 | 99.9 |
| 2 phr | 81.1 | 131 | 123 | 93.4 | 73.3 | 59.7 | 76.5 | 144 | 132 | 99.6 | 79.8 | 65.1 |
| 4 phr | 44.6 | 77.3 | 76.7 | 65.3 | 53.5 | 45 | 44.6 | 77.3 | 76.7 | 65.3 | 53.5 | 45 |
| 6 phr | 30.9 | 52.8 | 54.4 | 48 | 41.9 | 36.5 | 30.9 | 55.5 | 56.3 | 49.8 | 43.4 | 37.7 |
| T2 0 phr | 130 | 213 | 198 | 145 | 115 | 92.5 | 134 | 261 | 226 | 167 | 133 | 110 |
| 2 phr | 95.8 | 151 | 138 | 102 | 78.8 | 64.8 | 90.6 | 165 | 147 | 109 | 83.7 | 66.8 |
| 4 phr | 65 | 102 | 95.6 | 76.2 | 60.5 | 50.2 | 59 | 103 | 96.2 | 74 | 59.8 | 51.8 |
| 6 phr | 39.8 | 66.3 | 63 | 54.1 | 45.9 | 38.8 | 37.1 | 60.5 | 59.8 | 51.2 | 43.8 | 37.8 |
| T3 0 phr | 130 | 211 | 187 | 140 | 110 | 91 | 130 | 250 | 207 | 154 | 122 | 101 |
| 2 phr | 105 | 172 | 152 | 109 | 83.7 | 66.1 | 94.5 | 175 | 150 | 109 | 86.7 | 75.7 |
| 4 phr | 73.3 | 124 | 113 | 84.4 | 65.2 | 52.3 | 70.2 | 128 | 116 | 86.9 | 66.7 | 53.4 |
| 6 phr | 58.8 | 102 | 92.7 | 72.6 | 56.6 | 45.7 | 55.2 | 101 | 90.1 | 69.6 | 55.2 | 46.6 |
| D1 0 phr | 139 | 238 | 214 | 156 | 121 | 96.2 | 141 | 266 | 228 | 171 | 131 | 109 |
| 2 phr | 120 | 199 | 172 | 122 | 91.4 | 72.2 | 113 | 196 | 166 | 120 | 94.7 | 79.3 |
| 4 phr | 85.4 | 138 | 123 | 91.6 | 71.7 | 58.2 | 81.5 | 142 | 124 | 91.3 | 72.8 | 62.2 |
| 6 phr | 65.3 | 108 | 97 | 76 | 60 | 49.7 | 65.1 | 111 | 97.4 | 75.3 | 59.4 | 49.9 |
| D2 0 phr | 133 | 219 | 195 | 145 | 114 | 94.1 | 117 | 234 | 208 | 157 | 122 | 102 |
| 2 phr | 110 | 170 | 154 | 112 | 85.5 | 74.6 | 106 | 190 | 166 | 123 | 96.5 | 79.2 |
| 4 phr | 82 | 129 | 117 | 88.1 | 69 | 59.5 | 80.5 | 141 | 125 | 93.6 | 73.6 | 61.6 |
| 6 phr | 59.3 | 93.6 | 88.8 | 72.2 | 57.3 | 47.6 | 61.6 | 105 | 96.1 | 76.6 | 61.6 | 51 | levels by measurements of the Brookfield viscosity (method EN 2555). The measured viscosities are presented in Table 3 below.

TABLE 3

BROOKFIELD RHEOLOGY EN 2555
20 r.p.m, spindle 6, viscosity in poise

| | Ageing | | | | | | | |
|---|---|---|---|---|---|---|---|---|
| | 2 h | | | | 24 h | | | |
| | Usage levels (phr) | | | | | | | |
| | 0 | 2 | 4 | 6 | 0 | 2 | 4 | 6 |
| T1 | 88.5 | 56.5 | 44 | 36.5 | 90.5 | 58 | 43 | 40 |
| T2 | 85 | 65 | 50 | 40 | 75 | 53 | 40 | 32 |
| T3 | 88 | 75 | 68 | 65 | 78 | 63 | 51 | 45 |
| D1 | 88 | 70 | 61 | 58 | 77 | 58.5 | 48 | 42 |
| D2 | 88 | 73 | 68 | 65 | 80 | 63 | 51 | 46 |

Based on all of these results, we were able to calculate and extrapolate the approximate additional level of the diluents according to the invention to be added to the product in order to obtain the same viscosimetric profile as with a diluent of the prior art.

Table 4 presents the comparisons of the usage levels of T2 and T3 compared with those of D1 and D2.

TABLE 4

| Ti (phr) | Di/T3 (phr) | Di/T2 (phr) |
|---|---|---|
| 0-3 | +0.5 | +1 |
| 4-8 | +1 | +2 |
| 9-15 | +2 | +4 |

Thus, to obtain the same viscosimetric profile as the PVC paste containing 6 phr of T2, it will be necessary to use about 8 phr of a diluent D1 or D2 according to the invention in the PVC paste. If 4 phr of T3 is used in the paste, to obtain the same viscosity it will be necessary to introduce approximately 5 phr of D1 or D2 according to the invention in the paste.

Example 2

This example gives a comparison of the performance of a formulation of PVC paste using the diluents according to the invention with those using diluents of the prior art. This formulation is that of a floor covering containing PVC resins marketed by ARKEMA. This particular formulation contains:

TABLE 5

| PVC resin | Lacovyl PB1704 | 80 phr |
|---|---|---|
| PVC resin | Lacovyl PS1060 | 20 phr |
| Plasticizer | phthalate family | 37 phr |
| Stabilizer | organometallic complex* | 2.5 phr |
| co-stabilizer | epoxidized vegetable base | 2 phr |
| diluent to be evaluated | T1, T2, T3, D1, D2 | 2-2.5-3 phr** |

*for example Al, Sn, Ti, Zn carboxylate
**depending on the diluent in order to keep the same viscosimetric profile in all cases.

For this formulation the measurements comprised the deaeration performance, the thermal stability of the paste, optical and mechanical properties, the volatility of the paste at 70° C. and finally the VOC emissions from the paste.

The Deaeration Behaviour:

Samples of PVC paste prepared from the various diluents are placed under vacuum at up to 700 mm Hg under an atmosphere with controlled temperature (23° C.) and humidity (50%). The maximum volume of foam formed and the time to obtain it are measured. A reference diluent corresponding to a commercial product is systematically tested in parallel with each diluent in order to assess the variation of the results. Table 6 below presents all of the results obtained.

TABLE 6

| Designation | Ref 1 | T1 | Ref 2 | T2 | Ref 3 | T3 | Ref 4 | D1 | Ref 5 | D2 |
|---|---|---|---|---|---|---|---|---|---|---|
| level of diluent (phr) | 3 | 2 | 3 | 2 | 3 | 2.5 | 3 | 3 | 3 | 3 |
| r.p.s. At 600 mmHg (s) | 38 | ND | 38 | ND | 38 | ND | 38 | ND | 38 | ND |
| r.p.s. at 700 mmHg (s) | 100 | ND | 100 | ND | 100 | ND | 100 | ND | 100 | ND |
| Vol at 1 min 30 (ml) | 180 | 180 | 180 | 190 | 180 | 200 | 190 | 280 | 190 | 210 |
| Max vol (ml) | 230 | 220 | 230 | 240 | 230 | 250 | 265 | 320 | 260 | 370 |
| r.p.s. at max vol (s) | 105 | 105 | 105 | 105 | 105 | 105 | 115 | 110 | 115 | 120 |

ND: not determined

It can be seen from this table that the time taken to obtain the maximum volume of foam is almost identical whatever diluent is used. The most viscous products, D1 and D2, give a larger volume of foam, but this volume can be reduced by adding special antibubbling or antifoaming agents that are well known by a person skilled in the art.

Thermal Stability:

The PVC pastes are applied in layers with a thickness of 0.9 mm and are put in a stove at 200° C. (for example a Mathis oven). The variation of the yellow index is monitored as a function of time, in order to assess the degradation of the PVC. The results are given in Table 7 below.

TABLE 7

| | level of diluent | Yellow index | | | |
|---|---|---|---|---|---|
| Time (min) | (phr) | 1 | 2 | 3 | 4 |
| T1 | 2 | 4.0 | 4.5 | 6.7 | 19.6 |
| T2 | 2 | 3.6 | 4.6 | 7.0 | 21.4 |
| T3 | 2.5 | 3.6 | 5.0 | 6.8 | 22.6 |
| D1 | 3 | 3.6 | 5.0 | 7.5 | 22.2 |
| D2 | 3 | 3.7 | 4.9 | 7.6 | 26.1 |

These results do not show any significant difference comprised between the various diluents tested.

Optical Properties:

The pastes are applied as a layer with a thickness of 0.9 mm and are placed in a Mathis oven at 200° C. for 2 minutes, then the optical properties of each layer are measured by means of an instrument of the Hazemeter type according to a method based on ASTM standard D1003 to determine the transparency or T, the haze or H, or the clarity or C, as well as the mattness or M according to a method based on ASTM standard D523, the mattness being the complement to 100 of the measurement of the gloss. All of the measured results are presented in Table 8 below.

TABLE 8

| | level of diluent (phr) | T | H | C | M |
|---|---|---|---|---|---|
| T1 | 2 | 90.6 | 43.1 | 23.2 | 50.3 |
| T2 | 2 | 91.9 | 39.2 | 23.2 | 52.7 |
| T3 | 2.5 | 91.7 | 42.7 | 23.5 | 49.3 |
| D1 | 3 | 92.4 | 40.5 | 24.5 | 48.8 |
| D2 | 3 | 92.3 | 39.8 | 20.8 | 49.0 |

These results do not show any significant difference comprised between the various diluents tested.

Mechanical Properties:

The PVC pastes are applied as a layer with a thickness of 0.9 mm and are put in a Mathis oven at 200° C. for 2 minutes, then the mechanical properties of each layer are measured according to standard ISO R527. The results are presented in Table 9 below.

TABLE 9

| | level of diluent (phr) | Modulus at 100% (N/mm$^2$) | Breaking strength (N/mm$^2$) | Breaking elongation (%) |
|---|---|---|---|---|
| T1 | 2 | 11.5 | 19.8 | 254.9 |
| T2 | 2 | 10.1 | 18.4 | 258.5 |
| T3 | 2.5 | 11.5 | 19.5 | 252.8 |
| D1 | 3 | 11.9 | 19.3 | 254.6 |
| D2 | 3 | 11.9 | 19.4 | 255.4 |

These results do not show any significant difference comprised between the various diluents tested.

Volatility at 70° C.:

The PVC pastes are applied as a layer with a thickness of 0.9 mm and are placed in a Mathis oven at 70° C. for 2 minutes, then the volatility is measured as a function of time (after 1 h, after 4 h and then after 24 h), the volatility being expressed as weight loss (in % by weight). The results are presented in Table 10 below.

TABLE 10

| weight loss (%) | level of diluent (phr) | after 1 h | after 4 h | after 24 h |
|---|---|---|---|---|
| T1 | 2 | 0.43 | 0.75 | 1.44 |
| T2 | 2 | 0.35 | 0.69 | 1.32 |
| T3 | 2.5 | 0.1 | 0.13 | 0.92 |
| D1 | 3 | 0.08 | 0.09 | 0.50 |
| D2 | 3 | 0.02 | −0.04 | 0.19 |
| D3 | 3 | 0.08 | 0.11 | 0.57 |

Figure 2:
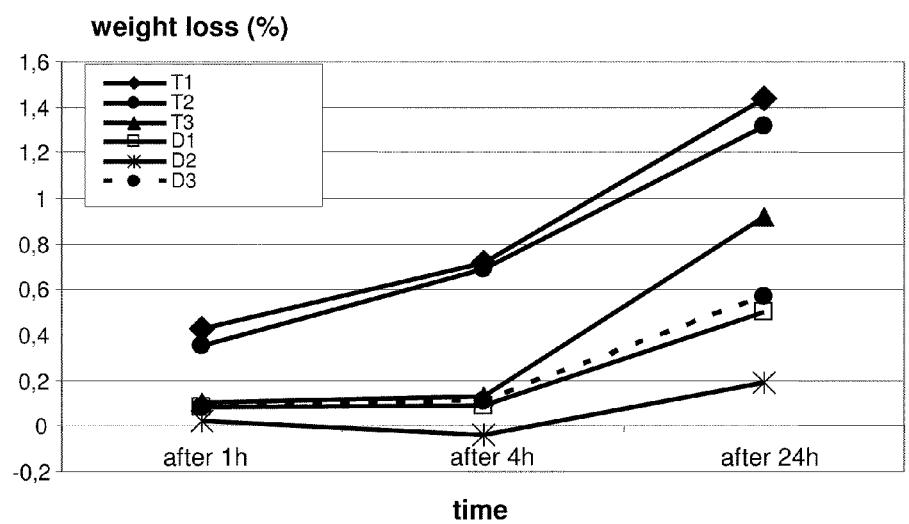
FIG. 2 is a graph showing volatility when using various diluents.

These results are presented in the diagram in FIG. 2. It can be seen that there is a notable decrease in the most volatile compounds when using diluents D1, D2 and D3 according to the invention relative to the use of conventional diluents T1, T2 and T3.

VOC Emissions:

Four samples of floor covering with the same composition, corresponding to PVC pastes containing diluents T2, D1, D2 and D3 respectively, were prepared on a coating line under the following operating conditions: temperature 200° C. for 2 minutes, layer thickness 0.9 mm, and identical level of diluent for the four diluents tested, namely 3 phr. The samples were tested according to standard ISO16000-9 under the conditions stated below:

TABLE 11

| VOC emission (µg/m3) | AgBB | Afsset | T2 | D1 | D2 | D3 |
|---|---|---|---|---|---|---|
| Total VOC (C6-C16) after 3 days | <10000 | <10000 | 9381 | 819 | 462 | 768 |
| carcinogenic substances after 3 days | <10 | <10 | Not detected | Not detected | Not detected | Not detected |
| total VOC (C6-C16) after 28 days | <1000 | <1000 | 799 | 90 | <162 | 77 |
| SVOC (C16-C22) after 28 days | <100 | — | 0 | 13.4 | 0 | 30.6 |
| carcinogenic substances after 28 days | <1 | <1 | Not detected | Not detected | Not detected | Not detected |
| R according to AgBB | <1 | — | 0.15 | 0.025 | 0.15 | 0.025 |
| R according to Afsset | — | <1 | 0.05 | 0.023 | 0.05 | 0.022 |
| Unidentified substances after 28 days | <100 | — | 391 | 0 | 0 | 0 |

The VOCs emitted are sampled at the chamber outlet by adsorption on cartridges of the TENAX type, and the chemical compounds retained are then recovered by chemical desorption and are then concentrated in a cryogenic trap before injection into a capillary column for gas chromatography. The VOCs are thus separated by gas chromatography by means of a capillary column. The organic compounds were detected, identified and quantified by means of a mass spectrometer connected to the outlet of the chromatographic column, according to standard ISO 16000-6.

The results obtained, presented in Table 12 below, were then compared with the limits of the schemes for the reduction of VOCs envisaged in the protocols AgBB dated 1 Mar. 2008 and Afsset from October 2006.

TABLE 12

| VOC emission (µg/m3) | AgBB | Afsset | T2 | D1 | D2 | D3 |
|---|---|---|---|---|---|---|
| Total VOCs (C6-C16) after 3 days | <10000 | <10000 | 9381 | 819 | 462 | 768 |
| carcinogenic substances after 3 days | <10 | <10 | Not detected | Not detected | Not detected | Not detected |
| Total VOCs (C6-C16) after 28 days | <1000 | <1000 | 799 | 90 | <162 | 77 |
| SVOC (C16-C22) after 28 days | <100 | — | 0 | 13.4 | 0 | 30.6 |
| carcinogenic substances after 28 days | <1 | <1 | Not detected | Not detected | Not detected | Not detected |
| R according to AgBB | <1 | — | 0.15 | 0.025 | 0.15 | 0.025 |
| R according to Afsset | — | <1 | 0.05 | 0.023 | 0.05 | 0.022 |
| Unidentified substances after 28 days | <100 | — | 391 | 0 | 0 | 0 |

The samples formulated on the basis of diluents D1, D2 and D3 according to the invention meet the requirements of the AgBB and Afsset protocols whereas that using diluent T2 of the prior art does not comply with the requirements of the AgBB scheme in terms of unidentified substances after 28 days, and the measurement of the total VOCs proves to be very close to the AgBB or Afsset limit. The present example has therefore clearly shown that the diluents according to the invention can be used for preparing PVC pastes and even floor coverings that have the same physical properties as the products used previously, although without the drawback of high VOC emissions.

Example 3

This example describes the use of diluents according to the invention in silicone mastics, particularly in the silicone mastics RTV-1 (Room Temperature Vulcanizable-1 component). The following table shows the typical composition of this type of mastic:

| | |
|---|---|
| Silicone polymer | 51.15% |
| Plasticizer | 34.10% |
| silicone oil | q.s. |
| hydrocarbon solvent | HC % |
| Crosslinking agent | 4.74% |
| silica | 10.00% |
| catalyst | 0.01% |

In this composition, the polymer/plasticizer ratio is 1.5/1 and the sum of hydrocarbon solvent (HC %)+silicone oil (q.s.) is equal to 34.1% by weight.

In Table 13 below, the amount of hydrocarbon solvent or HC is varied up to the limit of compatibility with the polymer and the loss of volume is measured according to standard ISO 10563 (after 7 days at 70° C.), this loss of volume being connected with evaporation of the lightest fractions of the plasticizers and ingredients used in the formulation, in particular including the VOCs. The larger the amount of VOC compounds in the mixture, the greater the loss of volume.

TABLE 13

| | HC content | | | | | |
|---|---|---|---|---|---|---|
| Hydrocarbon Solvent | 0% | 10% | 15% | 20% | 30% | 40% |
| D2 | 3.3 | 4.5 | 5.1 | | | |
| Hydroseal G400H | 3.3 | 9.8 | 12.2 | 15.1 | | |
| Hydroseal G3H | 3.3 | 14.4 | 19.3 | 24.4 | 34 | 44.7 |
| Hydroseal G250H | 3.3 | 16 | 20.8 | 25.9 | 37.2 | 47.5 |

In this table, the Hydroseal gas-oils are commercial references currently used in the trade.

Figure 3:
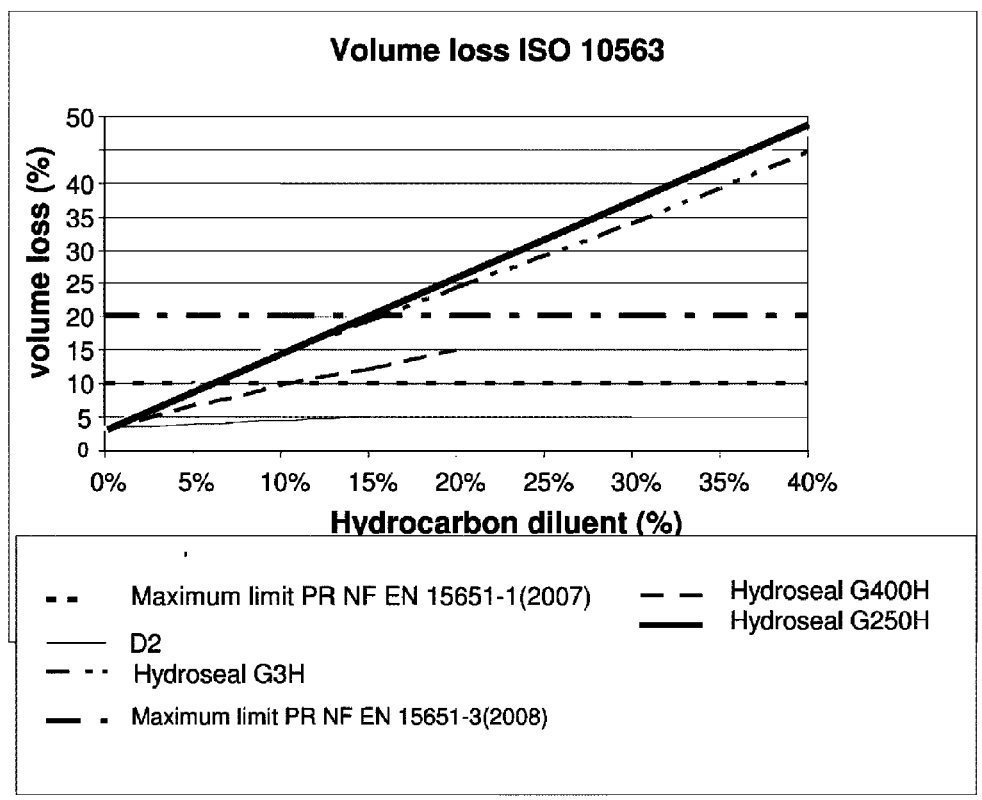
FIG. 3 is a graph showing losses of volume by evaporation.

FIG. 3 shows the losses of volume by evaporation and the positioning of the products according to draft specification PR NF EN 15651-3 (2008): sealants for sanitary joints and PR NF EN 15651-1 (2007): sealants for facade. Up to its limit of compatibility, in this case comprised between 15 and 20%, product D2 gives very favourable results as it shows less volume loss by evaporation than the products currently on the market. It thus makes it possible to meet the maximum limit of 10% of volume loss stipulated in standard PR NF EN 15651-1 (2007): sealants for facade, by replacing up to 15% by weight of silicone oil whereas the standard diluents only allow a lower level of replacement: approximately 5% for Hydroseal G250H and G3H, approximately 10% for Hydroseal G400H, and this increased substitution makes it possible to lower the cost of the formulation.

Example 4

This example describes the use of diluents according to the invention in silicone adhesives, in particular for the application of adhesives for parquet flooring comprising silane modified polymer technology. It relates more particularly to ST-PU (silane terminated polyurethane).

Table 14 compares two formulations: one including a plasticizer exclusively of the DPHP (di-2-propyl heptyl phthalate) type, the other containing a plasticizer system in which DPHP has been partially replaced with diluent D2 according to the present invention.

TABLE 14

| Composition (wt. %) | Phthalate | D2 |
|---|---|---|
| ST-PU polymer | 24.5 | 24.5 |
| Plasticizer | | |
| DPHP di-2-propyl heptyl phthalate | 15 | 9 |
| D2 | | 6 |
| adhesion promoter (organosilane) | 1.5 | 1.5 |
| drying agent (silane derivative) | 1.8 | 1.8 |
| mineral filler (calcium carbonate) | 56 | 56 |
| Rheology agent | 1 | 1 |
| Organic Sn (catalyst) | 0.2 | 0.2 |

These formulations were evaluated in the VOC emission test stipulated in the EMICODE reference document proposed by the GEV (Gemeinschaft Emissionskontrollierte Verlegewerkstoffe, which means: "Association for combating emissions in floor covering products and in their installation").

It should be noted that in Table 15 below the use of diluent D2 makes it possible to lower the total VOC emission relative to the formulation based on plasticizer of the phthalate type, permitting the label EMICODE EC 1 to be obtained. Results of the emission tests as envisaged in the GEV-EMICODE reference document:

TABLE 15

| Results | Phthalate | D2 |
|---|---|---|
| TVOC GEV | 150 | 80 |
| TVVOC (ISO 16000-6) | <20 | <20 |
| TVOC (ISO 16000-6) | 150 | 80 |
| TSVOC (ISO 16000-6) | <20 | <20 |
| 10 dominant compounds | | |
| Diethylene glycol | 29 | 63 |
| Unidentified | 130 | 57 |
| No. 3-10 not applicable | <20 | <20 |
| TVOC; emissions after 10 days below 500 μg/m³ | Emicode EC1: OK | Emicode EC1: OK |

The invention claimed is:

1. A composition of diluted polymer or diluted resin comprising a polymer or resin selected from the group consisting of homo- and copolymers of polyvinylchloride and modified silicone polymers; said polymer or resin being diluted with a hydrocarbon diluent having:
   a pour point below −15° C. according to ASTM standard D97;
   a boiling point of between 280 and 450° C.;
   more than 50% by weight of isoparaffins, and naphthenes from 10 to at most 40% by weight; and
   being constituted by a mixture of hydrocarbons, obtained by distillation of hydrodewaxed gas-oil cuts with a boiling point above 200° C.

2. The composition according to claim 1, wherein the polymer or resin is selected from homo- and copolymers of polyvinylchloride.

3. The composition according to claim 1, for use in a construction material, wherein the construction material is selected from the group consisting of adhesives, floor coverings, wallpapers, and mastics.

4. The composition according to claim 1, wherein the polymer or resin is selected from modified silicone polymers.

5. The composition according to claim 4, wherein the modified silicone polymer is selected from the group consisting of silane terminated polyethers, modified silane polymers, and silane terminated polyurethanes.

6. The composition according to claim 1, wherein the viscosity of the hydrocarbon diluent is greater than 5 mm$^2$/s at 40° C. according to ASTM standard D445.

7. The composition according to claim 1, wherein the hydrocarbon diluent is derived from the hydrodewaxing of various gas-oil cuts obtained by a process selected from the group consisting of atmospheric distillation, vacuum distillation, hydrotreating, hydrocracking, catalytic cracking and visbreaking, or alternatively products derived from the conversion of biomass.

8. The composition according to claim 7, wherein the hydrocarbon diluent is derived from the conversion of biomass after an additional treatment of desulphurization or removal of aromatics or both desulphurization and removal of aromatics.

9. The composition according to claim 1, wherein the hydrocarbon diluent is derived from a distillation cut of hydrodewaxed hydrocarbons with a pour point according to ASTM standard D97 below −30° C. and with a flash point above 140° C.

10. The composition according to claim 1, wherein the hydrocarbon diluent comprises from 20 to 35% by weight of naphthenes and more than 60% by weight of isoparaffins.

11. The composition according to claim 1, wherein the hydrocarbon diluent comprises more than 65% by weight of isoparaffins and less than 10% by weight of normal paraffins.

12. The composition according to claim 1, wherein the hydrocarbon diluent comprises less than 65% by weight of hydrocarbons having a chain length of between 16 and 22 carbon atoms, and more than 30% by weight of hydrocarbons having a chain length greater than 22 carbon atoms.

13. The composition according to claim 1, wherein the hydrocarbon diluent comprises less than 50% by weight of hydrocarbons having a chain length of between 16 and 22 carbon atoms, and more than 40% by weight of hydrocarbons having a chain length greater than 22 carbon atoms.

14. The composition according to claim 1, wherein the hydrocarbon diluent is devoid of normal paraffins.

15. The composition according to claim 1, wherein the hydrocarbon diluent has a sulphur content of less than 10 ppm.

16. The composition according to claim 1, wherein the hydrocarbon diluent contains less than 500 ppm of aromatics, as determined by UV spectrometry.

17. The composition according to claim 16, characterized in that the composition comprises more than 50% by weight of isoparaffins and less than 20% by weight of normal paraffins.

18. The composition according to claim 1 further comprising at least one additional diluent selected from the group consisting of:
  acids and esters of fatty acids with carbon chains with more than 16 carbon atoms,
  hydrocracked cuts of gas-oil type with a boiling point of between 200 and 450° C.,
  hydrotreated cuts of the gas-oil type with a boiling point of between 200 and 450° C., and
  hydrocracked and hydrotreated cuts of the gas-oil type with a boiling point of between 200 and 450° C.

19. A method of diluting a polymer or a resin comprising:
  obtaining a hydrodewaxed diluent comprising a pour point below −15° C. according to ASTM standard D97, a boiling point of between 280 and 450° C., comprising more than 50% by weight of isoparaffins, and naphthenes from 10 to at most 40% by weight, and constituted by a mixture of hydrocarbons obtained by distillation of hydrodewaxed gas-oil cuts with a boiling point above 200° C.; and
  diluting a polymer or a resin selected from the group consisting of homo- and copolymers of polyvinylchloride and modified silicone polymers, with said hydrodewaxed diluent.

20. The method according to claim 19, further comprising the step of combining the hydrodewaxed diluent with at least one additional diluent to generate a combination of diluents, wherein the at least one additional diluent is selected from the group consisting of acids and esters of fatty acids with carbon chains with more than 16 carbon atoms, hydrotreated cuts of the gas-oil type with a boiling point of between 200 and 450° C., and hydrocracked cuts of the gas-oil type with a boiling point of between 200 and 450° C.

21. The method according to claim 20, wherein the hydrotreated and/or hydrocracked cuts of the gas-oil type have a boiling point of between 280 and 450° C.

22. The method according to claim 19, wherein the diluted polymer or diluted resin is used in a construction material selected from the group consisting of adhesives, floor coverings, wallpapers, and mastics.

* * * * *